United States Patent Office 3,801,651
Patented Apr. 2, 1974

3,801,651
PROCESS FOR THE PREPARATION OF PYROCATECHOL AND ITS MONOETHERS
Gerhard Adolphen, Karlfried Wedemeyer, and Wilhelm Sutter, Cologne, Germany, assignors to Bayer AG, Leverkusen, Germany
No Drawing. Filed Dec. 20, 1971, Ser. No. 210,219
Claims priority, application Germany, Dec. 28, 1970, P 20 64 097.5
Int. Cl. C07c 43/20
U.S. Cl. 260—613 D                9 Claims

ABSTRACT OF THE DISCLOSURE

Pyrocatechol and its monoethers are prepared by dehydrogenating the corresponding cyclohexanone compounds over palladium on a lithium-aluminum spinel carrier at temperatures of 150° C. to 300° C.

BACKGROUND

This invention relates to a new process for the preparation of pyrocatechol and its monoethers.

The preparation of pyrocatechol by catalytic dehydrogenation of cyclohexane-1,2-diol over a Ni-Cu-Cr-Pt catalyst at 350° C. (Chitwood et al.; Ind. Eng. Chem. 44, 1696 (1952)) has been described as has the dehydrogenation of a dione, the p-menthen-(1)-ol-(2)-one-(3) at 330° C. over Pd/C to produce the corresponding pyrocatechol derivative (Treibs et al., J. Pr. Chemie [4] 8, 123 (1959)).

These known processes have considerable disadvantages. For instance, the Chitwood et al. process yields a mixture of products consisting of only 65% of pyrocatechol and 25% of phenol. Elimination of water from the reactants has therefore taken place to a considerable extent although a very large quantity of steam has been used as a diluent (cyclohexanediol as a 21% aqueous solution). The Treibs et al. process also does not provide very high yields, the conversion rate obtained in a single passage being from about 71 to 74%. Although this can be increased to from 80 to 85% by recycling unreacted starting material this involves increased separation work which would render the process very difficult to carry out if applied to the products in which we are interested owing to the close proximity of the different boiling points. Moreover, both processes are carried out at temperatures at which the compounds which are of interest show signs of decomposition and therefore also lead to a reduction of the catalyst life.

The ethers of pyrocatechol have previously generally been prepared by two processes:
(a) By partial alkylation of pyrocatechol; and
(b) From o-aminophenylalkylethers by diazotization and thermal decomposition.

Catalytic dehydrogenations of 2-alkoxycyclohexanones or cyclohexane-1,2-dione-monoenol ethers have not previously been described.

When the known processes and catalysts are applied to the production of the compound which are of interest it is found that they cannot be carried out economically owing to the thermal instability of these compounds. Splitting off of water and aromatization, splitting off of alcohol or of olefine and aromatization as well as condensations and resinification processes occur. These phenomena not only reduce the yields but also adversely influence the catalyst life.

SUMMARY

A process for the preparation of pyrocatechol and its monoethers by dehydrogenation of corresponding cyclohexane derivatives has now been found which is characterized in that compounds of the general formula

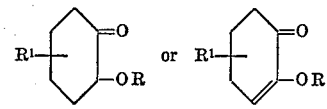

wherein
R represents hydrogen or an aliphatic radical optionally substituted by alkoxy groups; and
R¹ represents hydrogen or an alkyl radical with from 1 to 6 carbon atoms which may also contain a double bond (alkenyl), or compounds which form the above mentioned starting compounds under the reaction conditions.

are passed over a palladium catalyst on a Li-Al spinel carrier at a temperature in the range of 150° C. to 300° C.

DESCRIPTION

The aliphatic radicals R may be straight chain or branched alkyl radicals having up to 12 and preferably from 1 to 6 carbon atoms. The aliphatic radicals may, of course also be cycloalkyl radicals preferably containing 5 to 6 carbon atoms in the ring system. The aliphatic radical R which may be substituted by alkoxy groups with from 1 to 4 C atoms may, for example, be methoxyethyl, 3-methoxybutyl or 1,3-diethoxy-isopropyl radicals.

The alkyl radicals R¹ may be those with 1 to 6 and preferably 1–4 C atoms and they may also contain a double bond. The following ones are mentioned as examples of starting compounds which may be used for the process:

2-methoxy-cyclohexen-(1)-one-(3);
2-ethoxy-cyclohexen-(1)-one-(3);
2-isopropoxy-cyclohexen-(1)-one-(3);
2-cyclohexyloxy-cyclohexen-(1)-one-(3);
2-methoxyethoxy-cyclohexen-(1)-one-(3);
1-propenylcyclohexen-(1)-ol-(2)-one-(3);
1-allylcyclohexen-(1)-ol-(2)-one-(3);
cyclohexanedione-(1,2);
2-hydroxycyclohexanone;
2-methoxycyclohexanone;
2,2-dimethoxycyclohexanone, and
2-isopropoxy-cyclohexanone.

The following starting compounds are especially preferred:

2-methoxy-cyclohexen-(1)-one-(3);
2-isopropoxy-cyclohexen-(1)-one-(3);
cyclohexanedione;
2,2-dimethoxy-cyclohexanone;
1-allylcyclohexen-(1)-ol-(2)-one-(3);
1-propenylcyclohexen-(1)-ol-(2)-one-(3), and
2-hydroxy-cyclohexanone.

If the methylether of cyclohexen-(1)-ol-(2)-one-(3) is used, there may also be used a mixture of this ether and 2,2-dimethoxy-cyclohexanone because the latter compound yields 2-methoxy-cyclohexen-(1)-one-(3) under the reaction conditions.

The process according to the invention is carried out in the temperature range of from 150° C. to 300° C., preferably from 190° C. to 260° C. but best of all in the region of 210° C. to 250° C. The process is carried out in the vapor phase. The temperature is so chosen that the compound which is to be dehydrogenated can evaporate. In the case of very high boiling compounds, the process may be carried out at reduced pressure which should be so chosen that the desired temperature range can be observed. The process may, of course, also be carried out at slightly elevated pressure (up to about 5 atmospheres).

The process of the invention is advantageously carried out in the presence of a diluent, e.g. an inert gas such as nitrogen or argon but preferably steam. The addition of these diluents has the advantage of avoiding locally irregular temperatures; it reduces the partial pressure of the compounds so that higher boiling compounds can be evaporated at lower temperatures and it reduces the partial pressure of the hydrogen split off and hence reduces rehydrogenation of the compounds. Steam has the additional advantage of suppressing any dehydration which might otherwise take place.

The process of the invention is carried out with a carrier catalyst whose active component consists of palladium with additions of chromium and/or titanium. The catalyst carrier used is advantageously a lithium-aluminum spinel which contains up to 2.6% by weight of lithium and has an internal surface area of less than 100 $m.^2/g$. and preferably from 10 to 30 $m.^2/g$.

The catalyst contains as active component from 0.1 to 2%, preferably from 0.2 to 1% by weight of palladium, 0.1 to 2%, preferably 0.5 to 1.5% by weight of titanium or 0.1 to 2%, preferably 0.2 to 1.5% by weight of chromium or 0.2 to 2% by weight of chromium and titanium. The mixture of chromium and titanium may contain the two components in any proportion.

The total amount of active components in the catalyst is 0.3 to 4% by weight of the carrier catalysts used according to the invention.

Preparation of the catalyst used may be carried out by known methods.

The usual materials may be used as carriers, e.g. aluminum oxide, diatomite, pumice stone, meerschaum and active charcoal.

It is preferred to use a lithium-aluminum spinel carrier which has a lithium content of up to 2.6% by weight and an internal surface area of less than 100 $m.^2/g$. This may be prepared in known manner, for example as follows: Active forms of aluminum oxide, preferably $\gamma$-$Al_2O_3$ having an internal surface area of, e.g., 250 $m.^2/g$. are saturated at about 30° C. with a quantity of an aqueous lithium salt solution appropriate for the absorbency of the aluminum oxide, and the saturated $Al_2O_3$ is then dried at about 150° C. If necessary, saturation is repeated several times. After drying, the carrier is tempered for several hours at temperatures above 800° C. to produce the spinel.

To produce the catalyst, a carrier, preferably the lithium-aluminum spinel described above, is treated with a solution of compounds of palladium, chromium and/or titanium. Any process which enables the carrier to absorb a solution of the active catalytic substances is generally suitable for preparing the catalyst according to the invention. The palladium compound, chromium compound and titanium compound may be applied to the carrier as a combined solution or as separate solutions applied in any sequence by treating the carrier once or several times, and the metals may be used in the form of compounds which are soluble in water, acid, alkalies or organic solvents. The carrier material may be impregnated either only on the surface or throughout the material.

Conversion of the metal compounds into the active metallic form may be achieved either by reduction in the gaseous phase or liquid phase or by simple heat treatment. The reducing agents used may be, for example, hydrazine, formaldehyde or formic acid in the liquid phase or CO, $CH_4$ or $H_2$ in the gaseous phase.

Application of the metal compound to the carrier material and conversion of the metal compound into the active metallic form may be carried out either separately for each component or together. After formation of the active catalytic substance on the catalyst, foreign ions remaining from the process of preparation are washed out. The finished catalyst is finally dried, preferably at elevated temperature, for example in the range of from 50° C. to 150° C.

The process according to the invention is preferably carried out continuously, the evaporated starting compound mixed with inert gas being passed through a stationary or moving bed of catalyst.

When the catalyst used for the process has lost some of its activity it can easily be completely regenerated by the usual method of combustion with air.

The starting compounds used for the process of the invention are known or can be obtained in known manner by reacting the hemihydrate of cyclohexane-1,2-dione with the corresponding alcohols in the presence of acid catalysts. They may also be prepared by treating 2-chlorocyclohexanone with bases in the presence of water or a suitable alcohol.

The compounds obtained by the process according to the invention are valuable intermediate products for the preparation of plant protective agents.

The temperatures in the following examples are given in degree centigrade. The following apparatus is employed:

Experimental apparatus

The apparatus comprises a reactor consisting of an upright double walled pipe having a length of about 45 cm. and an internal width of 2 cm. A cooling coil the internal tube of which serves as an evaporator is mounted on the reactor. The evaporator and reactor are heated by a thermostat through which oil is circulated by pumping. The substance is injected into the top of the evaporator by a pump and after passing over the catalyst it is condensed in a following flask with cooler attached. The catalyst is mounted on a sieve inserted in the reactor. Any empty space above the catalyst is filled with glass beads.

EXAMPLE 1

The reactor is charged with 100 ml. (=milliliter) of catalyst (0.5% by weight of palladium and 1% by weight of chromium on lithium-aluminum spinel). 15 ml. per hour of 2-isopropoxy-cyclohexen-(1)-one-(3) are injected at 240° C. The substance is diluted with a stream of nitrogen introduced at the rate of 7.2 liters per hour. The condensate consists according to gas chromatographic analysis of 1.2% of forerun, 5.6% of 2-isopropoxy-cyclohexanone, 1.1% of phenol, 91.9% of 2-isopropoxyphenol and 0.2% of tails.

In 17 hours, 275 g. of 2-isopropoxycyclohexene-(1)-one-(3) were injected and 267 g. of condensate were recovered. Taking into account the hydrogen split off, the loss amounted to 5 g.=1.8%, most of which was deposited as tar in the evaporator.

In experiments analogous to that described in Example 1, 2-cyclohexyloxy-cyclohexen-(1)-one-(3) (B.P.: 122°/3 mm. Hg) was dehydrogenated to pyrocatechol monocyclohexylether (B.P.: 143°/10 mm. Hg); 2-methoxy-cyclohexene-(1)-one-(3) (B.P.: 96–99°/10 mm. Hg) to guaiacol; 2-ethoxy-cyclohexene-(1)-one-(3) (B.P.: 97–105°/9 mm. Hg) to pyrocatechol monoethyl ether (B.P.: 99–100°/17 mm. Hg); and 2-sec.-butyloxy-cyclohexen-(1)-one-(3) (B.P.: 102–106°/6 mm. Hg) to pyrocatechol mono-sec.-butyl ether (B.P.: 112–115°/15 mm./Hg).

EXAMPLE 2

A catalyst containing 0.5% by weight of palladium on lithium-aluminum spinel without added chromium was introduced into the apparatus described above. The apparatus was charged with 15 ml. per hour of 2-isopropoxy-cyclohexene-(1)-one-(3) and 7.2 liters per hour of $N_2$ at 230° C.

Analysis of the condensate yielded the following results: 2.6% of forerun, 11.5% of isopropoxycyclohexanone-(2), 1.4% of phenol, 79.1% of isopropoxyphenol and 5.4% of tails.

EXAMPLE 3

7.5 ml./hour of 2-isopropoxy-cyclohexene-(1)-one-(3) are dehydrogenated under the same conditions as in Example 1.

Analysis of the condensate yielded the following results:

0.6% of forerun, 4.8% of 2-isopropoxyclohexanone, 0.5% of phenol and 94.1% of 2-isopropoxyphenol.

EXAMPLE 4

The evaporator in the apparatus described in the beginning was replaced by a heatable dropping funnel. 15 g. of cyclohexanedione-(1,2) per hour were dripped directly onto the heated column (230° C.) and triturated with 13 liters per hour of nitrogen, 50 ml. of the catalyst mentioned in Example 1 were required. 12.8 g. of condensate composed of 3.2% of forerun, 2.5% of intermediates, 90.3% of pyrocatechol and 3.9% of tails were collected.

EXAMPLE 5

The apparatus described in Example 1 was charged with 50 ml. of the same catalyst. 15 ml. of 2-isopropoxycyclohexanone and 8 liters per hour of steam were passed over the catalyst at 210° C. The condensate had the following composition:

10.6% or forerun, 15.5% of 2-isopropoxy-cyclohexanone, 4.0% of phenol, 68.6% of 2-isopropoxyphenol and 0.7% of 2-isopropoxycyclohexene-(1)-one-(3).

EXAMPLE 6

The apparatus used in Example 1 was charged with 50 ml. of a catalyst (0.5% by weight of palladium and 1.3% by weight of titanium on Li-Al spinel). 15 ml. per hour of 2-isopropoxycyclohexene-(1)-one-(3) diluted with 7.2 liters per hour of nitrogen were passed through the apparatus at 210° C. The condensate had the following composition: Forerun 1.4%, 2-isopropoxy-cyclohexanone 12.2%, phenol 1.2%, 2-isopropoxyphenol 85.1%, forerun 0.2%.

EXAMPLE 7

The apparatus used in Example 1 was charged with 50 ml. of a catalyst consisting of 0.5% by weight of palladium and 1% by weight of chromium on Li-Al spinel. 15 ml. per hour of 2-methoxycyclohexen-(1)-one-(3) and 7.2 liters per hour of nitrogen were passed through the apparatus. The condensate had the following composition: Forerun 2.4%, 2-methoxycyclohexanone 9.5%, phenol 1.1%, guaiacol 84.9%, 2-methoxycyclohexen-(1)-one-(3) 1.8%, tails 0.3%.

2,2-dimethoxy-cyclohexanone and a mixture of 2-methoxy-cyclohexen-(1)-one-(3) and 2,2-dimethoxy-cyclohexanone were introduced in the same way and with practically the same yields. The last mentioned mixture was obtained as follows:

230 g. of cyclohexanedione-(1,2)-hemihydrate (86.8%) prepared according to Bull. Soc. Chim. Belg. 73, pages 75–76 (1964) in a mixture of 350 ml. of methanol, 300 ml. of chloroform and 2 g. of benzene sulphonic acid are heated to boiling in a flask fitted with a distillation column having a length of 1 m. and a diameter of 30 mm. The ascending vapors are condensed and separated by means of a water separator for specifically heavier liquids. The upper phase consisting of aqueous methanol is removed and the lower phase consisting of a mixture of chloroform and methanol is returned to the head of the column. When no more aqueous phase separates, which is after about 33 hours, 6 g. of precipitated $CaCO_3$ is added to the bottoms to neutralize the acid, and the solvents are then evaporated off at normal pressure. The residue is distilled under vacuum. 230 g. of distillate having the following composition is obtained at B.P. 112–142°/50 mm. Hg: 66% of 2,2-dimethoxycyclohexanone and 33% of 2-methoxy-cyclohexen-(1)-one-(3).

The two compounds may be separated by fractionation into 2,2-dimethoxycyclohexanone, B.P. 112°/50 mm. Hg, and 2-methoxycyclohexen-(1)-one-(3), B.P. 142°/50 mm. Hg.

The enol ethers used according to the invention may be prepared in analogous manner.

EXAMPLE 8

The apparatus described in Experiment 4 was charged with 100 ml. of catalyst (0.5% of Pd, 1% of Cr on Li-Al spinel). 15 g. of 2-hydroxy-cyclohexanone per hour were added dropwise at a catalyst temperature of 230° C. and washed with 10 liters per hour of nitrogen. Conversion was 43%, the yield of pyrocatechol 66.5% based on the conversion rate.

What is claimed is:

1. Process for preparing pyrocatechol and its monoethers which comprises dehydrogenating compounds having the formulae

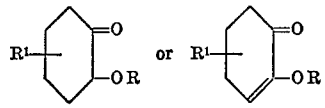

wherein
R is selected from the group of hydrogen, alkyl having up to 12 carbon atoms, cycloalkyl having 5 to 6 carbon atoms, and the foregoing substituted by alkoxy having 1 to 4 carbon atoms
$R^1$ is selected from the group of hydrogen, alkyl having 1 to 6 carbon atoms and alkenyl having 1 to 6 carbon atoms
by passing said compounds over a catalyst consisting essentially of from 0.1 to 2% by weight palladium and 0.1 to 2% by weight titanium or from 0.1 to 2% by weight palladium and 0.1 to 2% by weight chromium, or 0.1 to 2% by weight palladium and 0.2 to 2% by weight chromium and titanium, on a Li-Al spinel carrier at temperatures of 150° C. to 300° C.

2. Process of claim 1 wherein said catalyst consists essentially of from 0.2 to 1% by weight palladium and 0.5 to 1.5% by weight titanium.

3. Process of claim 1 wherein said catalyst consists essentially of from 0.2 to 1% by weight palladium and 0.2 to 1.5% by weight chromium.

4. Process of claim 1 wherein said catalyst consists essentially of from 0.2 to 1% by weight palladium and 0.2 to 2% by weight of chromium and titanium.

5. Process of claim 1 carried out with steam as a diluent.

6. Process of claim 1 carried out at temperatures of 210° C. to 250° C.

7. Process of claim 1 carried out at reduced pressure.

8. Process of claim 1 wherein the starting compound is selected from the group of 2-methoxy-cyclohexen-(1)-one-(3); 2-isopropoxy-cyclohexen-(1)-one-(3); cyclohexanedione-(1,2); 2,2-dimethoxy-cyclohexanone; 1-allylcyclohexen-(1)-ol-(2)-one-(3); 1-propenylcyclohexen-(1)-ol-(2)-one-(3); 2-hydroxy-cyclohexanone; and a mixture of 2-methoxy-cyclohexen-(1)-one-(3) and 2,2-dimethoxy-cyclohexanone.

9. Process of claim 1 carried out continuously.

References Cited
UNITED STATES PATENTS

| | | | |
|---|---|---|---|
| 3,580,970 | 5/1971 | Swift | 260—621 H |
| 3,373,219 | 3/1968 | Kronig et al. | 252—466 PT |
| 3,315,007 | 4/1967 | Abell et al. | 252—466 PT |
| 3,315,008 | 4/1967 | Abell et al. | 252—466 PT |
| 2,662,861 | 12/1953 | Riblett et al. | 252—466 PT |
| 2,628,985 | 2/1953 | Winkler et al. | 260—621 H |
| 2,708,208 | 5/1955 | Furman et al. | 260—121 H |
| 2,291,585 | 2/1942 | Bartlett et al. | 260—621 H |
| 3,394,399 | 2/1968 | Bajer et al. | 260—621 H |

OTHER REFERENCES

Treibs et al.: J. for Prakt. Chem., 4, vol. 8, 1959, pp. 123–128.

HOWARD T. MARS, Primary Examiner

U.S. Cl. X.R.

210—621 H; 252—466 PT